United States Patent
Shiue

(10) Patent No.: US 10,011,333 B2
(45) Date of Patent: Jul. 3, 2018

(54) MULTI-LAYER WETSUIT MATERIAL AND WETSUIT

(71) Applicant: Jeff Heng-Wen Shiue, Wujie (TW)

(72) Inventor: Jeff Heng-Wen Shiue, Wujie (TW)

(73) Assignee: SHEI CHUNG HSIN IND. CO., LTD., Wujei (TW)

( * ) Notice: Subject to any disclaimer, the term of this patent is extended or adjusted under 35 U.S.C. 154(b) by 173 days.

(21) Appl. No.: 15/169,749

(22) Filed: Jun. 1, 2016

(65) Prior Publication Data
US 2017/0349249 A1   Dec. 7, 2017

(51) Int. Cl.
| | |
|---|---|
| *B63C 11/04* | (2006.01) |
| *B32B 5/02* | (2006.01) |
| *B32B 15/04* | (2006.01) |
| *B32B 5/18* | (2006.01) |
| *B32B 7/12* | (2006.01) |

(52) U.S. Cl.
CPC ............... *B63C 11/04* (2013.01); *B32B 5/02* (2013.01); *B32B 5/18* (2013.01); *B32B 7/12* (2013.01); *B32B 15/04* (2013.01); *B32B 2255/00* (2013.01); *B32B 2307/30* (2013.01); *B32B 2307/416* (2013.01); *B32B 2437/00* (2013.01); *B63C 2011/046* (2013.01)

(58) Field of Classification Search
CPC .. B32B 7/12; B32B 15/04; B32B 5/18; B32B 5/02; B63C 11/04
See application file for complete search history.

(56) References Cited

U.S. PATENT DOCUMENTS

| | | | | |
|---|---|---|---|---|
| 7,144,936 B2* | 12/2006 | Musch | ................. | A61K 8/27 524/273 |
| 2006/0183849 A1* | 8/2006 | Liu | ................. | C08G 18/0823 524/589 |
| 2007/0012397 A1* | 1/2007 | de Jong | ............ | A41D 31/0038 156/252 |
| 2011/0265233 A1* | 11/2011 | Shiue | ................. | A41D 13/012 2/2.15 |
| 2012/0276332 A1* | 11/2012 | Conolly | .............. | C23C 14/562 428/138 |

* cited by examiner

*Primary Examiner* — Hai Vo

(57) ABSTRACT

A multi-layer wetsuit material comprises: an inner fabric layer adjacent to a wearer's skin, an aluminum-foil layer adhered on the inner fabric layer, a rubber or neoprene foam layer adhered to the aluminum-foil layer, and an outer fabric layer opposite to the inner fabric layer adhered on the rubber foam layer, whereby the aluminum-foil layer will reflect the body heat, as radiated from the wearer's skin, backwards towards the wearer's skin to keep the wearer warm.

5 Claims, 1 Drawing Sheet

MULTI-LAYER WETSUIT MATERIAL AND WETSUIT

BACKGROUND OF THE INVENTION

US 2007/0006365. invented by Shue, Min-Chen, disclosed a heat retaining wetsuit which comprises two layers of laminated rubber sponge material, a stuffing material is located in selected areas between the two rubber sponges to form air chambers (3), thereby providing heat retaining or thermal insulation for the wearer.

However, such a heat retaining wetsuit becomes cumbersome and clumsy because the air chambers may increase the volume and thickness of the wetsuit, causing inconvenience and uncomfortableness for the wearer.

The present inventor has found the drawbacks of the prior art and invented the present wetsuit having thin construction but still keeping the wearer warm.

SUMMARY OF THE INVENTION

The object of the present invention is to provide a multi-layer wetsuit material comprising: an inner fabric layer adjacent to a wearer's skin, an aluminum-foil layer adhered on the inner fabric layer, a rubber or neoprene foam layer adhered to the aluminum-foil layer, and an outer fabric layer opposite to the inner fabric layer adhered on the rubber foam layer, whereby the aluminum-foil layer will reflect the body heat, as radiated from the wearer's skin, backwards towards the wearer's skin to keep the wearer warm.

DETAILED DESCRIPTION

Figure 1:
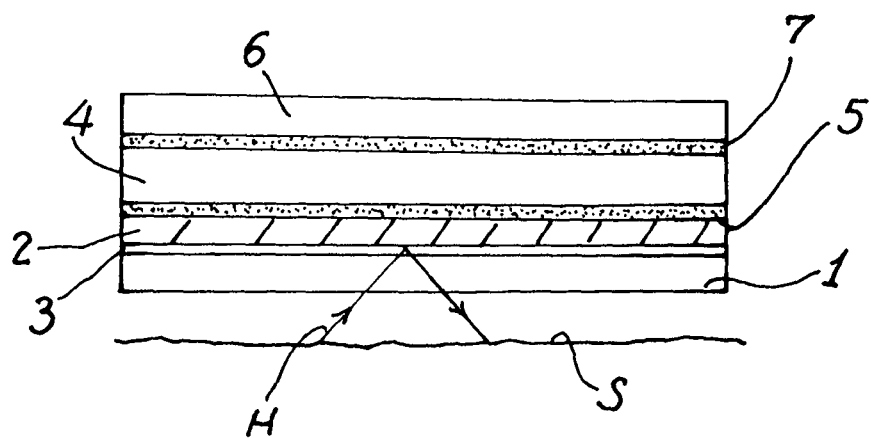
FIG. 1 is a sectional drawing showing the multi-layer wetsuit material of the present invention.

As shown in FIG. 1, the wetsuit material of the present invention comprises: an inner fabric layer 1 adjacent to a wearer's skin S; an aluminum-foil layer 2 including an aluminum foil adhered on the inner fabric layer 1 by a first adhesive 3; a rubber (or neoprene) foam layer 4 adhered on the aluminum-foil layer 2 with a second adhesive 5; and an outer fabric layer 6 adhered on the rubber foam layer 4 by a third adhesive 7.

The outer fabric layer 6 and the third adhesive 7 may be eliminated for options of factory production.

The inner fabric layer 1 is selected from a fabric, especially a color fabric, either an elastic fabric or a non-elastic fabric.

The elastic fabric may include Spandex knitted or woven with polyester, or polyamide, or other filaments, fibers or yarns. It may be made with the following steps:
A. Knitting;
B. Washing, including: continuous shrinking, oil-removing and scouring;
C. Pre-heat-setting, including: setting width, improving the curly edge and homogenous coloring:
D. Dyeing; and
E. Post heat-setting or Finishing, including fixing the weight and width, and improving fabric stretch of the fabric product.

Alternatively, the inner fabric layer 1 may also be selected from a non-elastic fabric, which may be made with the following steps:
A. Knitting, excluding Spandex;
B. Dyeing; and
C. Post heat-setting or Finishing.

For adhering the aluminum-foil layer 2 on the inner fabric layer 1, a first adhesive 3, namely, a polyurethane reactive hot melt (PUR) adhesive is applied on the adjoining, surface of the inner fabric layer 1 for adhering the aluminum-foil layer 2 on the inner fabric layer 1 as bonded by the first adhesive 3 (the PUR adhesive) under temperature of 150° C.

Figure 2:
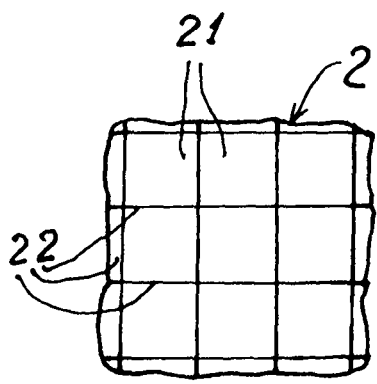
FIG. 2 is an illustration showing the aluminum foil as crisscrossed in accordance with the present invention.

The aluminum-foil layer 2 may be an aluminum foil which is further crisscrossed to form a plurality of square aluminum chips 21, each chip 21 surrounded with a grating channel 22 as shown in FIG. 2 to thereby crosslinkingly form a plurality of grating channels. Such grating channels 22 are fluidically communicated with one another.

The aluminum-foil layer 2 should be made to allow a radiation-heat reflective surface (or surfaces) of the aluminum foil, namely, the plurality of square aluminum chips 21 to face towards the wearer's skin S to thereby reflect the body heat H as radiated from the wearer's skin S backwards towards the wearer's skin S to keep him or her warm or warmer as shown in arrow line of FIG. 1.

Also, the first adhesive 1 should be transparent or translucent for transmitting the radiation heat through the adhesive layer. Fortunately, the PUR adhesive is transparent or with a light yellow color, helpful for transmitting the radiation body heat and reflecting it backwards towards the wearer's skin.

After adhering the aluminum-foil layer 2 on the inner fabric layer 1, the rubber foam (or neoprene foam) layer 4 is coated with a second adhesive 5 on an adjoining surface (the bottom surface of layer 4 of FIG. 1) of the rubber foam layer 4. Then the rubber foam layer 4 is adhered on the aluminum-foil layer 2 as bonded by the second adhesive 5 at room temperature. for example, 25° C.

The second adhesive 5 is a solvent glue including polychloropene adhesive.

Finally, an outer fabric layer 6 is adhered on the rubber foam layer 4 with a third adhesive 7 to form the multi-layer wetsuit material as shown in FIG. 1. The outer fabric layer 6 may be made with the same raw materials of the inner fabric layer 1. The third adhesive 7 may be the same as the second adhesive 5.

The multi-layer wetsuit thus laminated is subjected, to drying at a temperature of 80~90° C. for 50~90 seconds to obtain the final wetsuit material, a multiple-layer wetsuit material.

Then, the wetsuit material as obtained as aforementioned may be cut to form a plurality of panels. The adjoining or adjacent panels are connected by sewing, gluing, taping, or any other joining method to obtain a wetsuit accordingly.

The wetsuit of the present invention may increase a temperature of 1.5 degrees to 2.0 degrees Centigrade, due to the lamination of the heat-reflective aluminum foil in the multi-layer wetsuit material, to be warmer than the conventional wetsuit without, lamination of the aluminum foil as taught by the present invention.

The present invention, especially when the aluminum foil is crisscrossed, may have the following advantages:
1. The crisscrossed aluminum foil chips 21 surrounded by grating channels 22 may be ergonomically suited for the body curvature of the wearer to efficiently reflect the body heat at any location or portion of the wearer's body.

2. The grating channels 22 may make the wetsuit easily pliable or drapable to thereby increase the drapability of the wetsuit.

3. The grating channel or channels 22 may form a "ventilation network" within the aluminum-foil layer 2 to buffer the fluid flow of air or vapor as trapped within the laminated wetsuit.

4. The aluminum foil is a light thin layer which may not increase the total volume and thickness of the wetsuit, thereby making, the wearer more comfortable, more maneuverable, and more ergonomical, while still keeping him or her warmer when diving or doing water sports in cold, weather or under deep water.

The present invention may be further modified without departing from the spirit and scope of the present invention. For instance, the aluminum-foil layer 2 may be replaced with an aluminum film or aluminum-metallized film laminated in the multi-layer laminate wetsuit material.

I claim:

1. A multi-layer wetsuit material comprising:

an inner fabric layer adjacent to a wearer's skin;

an aluminum-foil layer including an aluminum foil adhered on the inner fabric layer by a polyurethane reactive hot melt adhesive for bonding said aluminum-foil layer and said inner fabric layer;

said aluminum-foil layer comprising an aluminum foil crisscrossed to form a plurality of square aluminum chips, each said chip surrounded with a grating channel to crosslinkingly form a plurality of grating channels; said grating channels fluidically communicated with one another;

a rubber foam layer adhered on the aluminum-foil layer with a solvent glue including polychloroprene adhesive; and an outer fabric layer adhered on the rubber foam layer by a solvent glue including polychloroprene adhesive.

2. A multi-layer wetsuit material according to claim 1, wherein each said fabric layer includes a color fabric which is selected from an elastic color fabric and a non-elastic color fabric.

3. A multi-layer wetsuit material according to claim 1, wherein said aluminum-foil layer includes a radiation-heat reflective surface of the aluminum foil facing towards a wearer's skin to reflect the body heat as radiated from the wearer's skin backwards towards the wearer's skin to keep the wearer warm.

4. A multi-layer wetsuit material according to claim 1, wherein said rubber foam layer includes a neoprene foam layer.

5. A wetsuit material according to claim 1, wherein at least two adjoining panels of said wetsuit material are connected by sewing, gluing, taping or joining at least two adjoining panels of said wetsuit material to form a wetsuit.

* * * * *